US009944118B2

(12) United States Patent
Gong et al.

(10) Patent No.: US 9,944,118 B2
(45) Date of Patent: Apr. 17, 2018

(54) ROTATION STRUCTURE WITH ELASTIC PROTECTION CASING

(71) Applicant: CHENGDU YOUYANG ELECTROMECHANICAL PRODUCT DESIGN CO., LTD., Sichuan (CN)

(72) Inventors: Shugang Gong, Guangdong (CN); Xingyin Wu, Guangdong (CN); Shanjing Zhu, Guangdong (CN); Tao Huang, Guangdong (CN); Shaorong Lin, Guangdong (CN)

(73) Assignee: CHENGDU YOUYANG ELECTROMECHANICAL PRODUCT DESIGN CO., LTD., Sichuan (CN)

( * ) Notice: Subject to any disclaimer, the term of this patent is extended or adjusted under 35 U.S.C. 154(b) by 108 days.

(21) Appl. No.: 14/899,655

(22) PCT Filed: Jun. 19, 2013

(86) PCT No.: PCT/CN2013/077480
§ 371 (c)(1),
(2) Date: Dec. 18, 2015

(87) PCT Pub. No.: WO2014/201639
PCT Pub. Date: Dec. 24, 2014

(65) Prior Publication Data
US 2016/0159166 A1  Jun. 9, 2016

(51) Int. Cl.
*B60B 25/08* (2006.01)
*B60B 25/12* (2006.01)
*B60C 7/24* (2006.01)

(52) U.S. Cl.
CPC .............. *B60B 25/08* (2013.01); *B60B 25/12* (2013.01); *B60C 7/24* (2013.01)

(58) Field of Classification Search
CPC ......... B60B 25/04; B60B 25/08; B60B 25/12; B60C 7/24
See application file for complete search history.

(56) References Cited

U.S. PATENT DOCUMENTS 1,991,497 A * 2/1935 Dixon .................... B60B 3/005
301/10.1
3,977,727 A * 8/1976 Glasenapp .............. B60B 21/10
152/384
(Continued)

FOREIGN PATENT DOCUMENTS

CN     2696878      5/2005
CN    102256823    11/2011
(Continued)

OTHER PUBLICATIONS

International Search Report filed PCT/CN2013/077480 dated Mar. 27, 2014.

*Primary Examiner* — Kip T Kotter
(74) *Attorney, Agent, or Firm* — Rankin, Hill & Clark LLP

(57) ABSTRACT

A rotation structure with an elastic protection casing includes a stator and a rotor. The rotor is sheathed on a periphery of the stator. A periphery of the rotor is provided with the elastic protection casing. The elastic protection casing is substantially annular and arranged to surround the periphery of the rotor. The elastic protection casing is sheathed on the periphery of the rotor.

2 Claims, 4 Drawing Sheets

(56) References Cited

U.S. PATENT DOCUMENTS

| | | | | |
|---|---|---|---|---|
| 4,190,092 | A * | 2/1980 | Evans | B60B 21/10 |
| | | | | 152/381.4 |
| 8,616,314 | B2 * | 12/2013 | Murata | B60B 25/045 |
| | | | | 180/65.51 |
| 8,833,694 | B2 * | 9/2014 | Gilleran | B64C 25/405 |
| | | | | 188/65.1 |
| 2011/0057503 | A1 | 3/2011 | Marsaly et al. | |
| 2011/0139523 | A1 * | 6/2011 | Chen | B60K 7/0007 |
| | | | | 180/65.51 |

FOREIGN PATENT DOCUMENTS

| | | |
|---|---|---|
| CN | 202038113 | 11/2011 |
| CN | 202080068 | 12/2011 |
| DE | 102007049767 | 4/2009 |

* cited by examiner

ROTATION STRUCTURE WITH ELASTIC PROTECTION CASING

FIELD OF THE INVENTION

The present application relates to the technical field of rotation structures, and more particularly to a rotation structure with an elastic protection casing.

BACKGROUND OF THE INVENTION

Rotation structures, such as bearings, wheels, tires, and so on, are indispensable important parts of existing machine apparatuses.

In the prior art, a rotation structure needs to rotate continuously or discontinuously during a working process. Based on working requirements, a periphery of a rotation structure may need to engage with other components in some cases, for example, in friction transmission. Generally, a periphery of an existing rotation structure is provided with no protection structure, and the bare periphery engages with other components directly or indirectly. Thus, the periphery may be subjected to great radial impact, and the rotation structure may be damaged. Furthermore, the rotation structure is prone to be wetted in working environments, and may contact corrosive gases or liquids directly and be corroded, such that the service life of the rotation structure is adversely affected. Additionally, noise of rotation structures is always a common problem troubling technicians, because most existing rotation structures have the shortcoming of too much noise.

SUMMARY OF THE INVENTION

A purpose of the present application is to provide a rotation structure with an elastic protection casing, which aims to solve the problem that a rotation structure in the prior art may be subjected to too great radial impact when transmitting power to other structures or devices, may be prone to be corroded and then damaged, and may generate too much noise.

The present application is realized by the following technical solution: a rotation structure with an elastic protection casing, comprising a stator and a rotor; wherein, the rotor is sheathed on a periphery of the stator, a periphery of the rotor is provided with the elastic protection casing, the elastic protection casing is substantially annular and arranged to surround the periphery of the rotor.

Preferably, a radial inner surface of the elastic protection casing abuts against the periphery of the rotor, two sides of an radial outward end of the elastic protection casing extend axially outward and form an expanded structure, and step structures are respectively formed on an upper side surface and a lower side surface (per the orientation shown in FIG. 1) of the outward end.

Preferably, a height of each of the two upper and lower side surfaces of the outward end of the elastic protection casing is larger than a height of the rotor.

Preferably, the stator is sheathed on a periphery of a stator shaft, and a rotor supporting frame is also sheathed on the periphery of the stator shaft; the rotor supporting frame is rotatably connected with the stator shaft, and the rotor is connected with the rotor supporting frame.

Preferably, a plurality of fastening members arranged spacedly are sheathed on the periphery of the rotor, and the radial inner surface of the elastic protection casing abuts against the fastening members.

Preferably, an upper end surface of the rotor is provided with an arrest frame, the arrest frame is arranged to extend along and surround the upper end surface of the rotor.

Preferably, the upper end surface of the rotor is provided with an upper fixing frame, the upper fixing frame is arranged to extend along and surround the upper end surface of the rotor, one end of the upper fixing frame is connected with the arrest frame, and another end of the upper fixing frame extends towards the outward end of the elastic protection casing to form an upper pressing board pressing against the step structure on the upper side surface of the outward end of the elastic protection casing.

Preferably, the upper pressing board presses against the step structure on the upper side surface of the outward end of the elastic protection casing and extends out of the step structure.

Preferably, one end of the rotor supporting frame is rotatably connected with the stator shaft, and another end of the rotor supporting frame extends towards the outward end of the elastic protection casing to form a lower pressing board pressing against the step structure on the lower side surface of the outward end of the elastic protection casing.

Preferably, the lower pressing board presses against the step structure on the bottom side surface of the outward end of the elastic protection casing and extends out of the step structure.

Compared with the prior art, the rotation structure provided by the present application comprises the elastic protection casing sheathed on the periphery of the rotor. The elastic protection casing has the elastic deformation effect, when the rotation structure transmits power to other structures or devices, the elastic protection casing can reduce radial impacts of external forces onto the rotor and protect the periphery of the rotor, so that the service life of the rotation structure can be greatly extended. Moreover, the elastic protection casing can absorb most noise generated by the rotation structure, such that the rotation structure can be suitable for situations with high requirements.

DETAILED DESCRIPTION OF THE PREFERRED EMBODIMENT

In order to make the purposes, technical solutions, and advantages of the present application be clearer, the present application will be further described in detail hereafter with reference to the accompanying drawings and embodiments. It should be understood that the embodiments described herein are only intended to illustrate but not to limit the present application.

Realization for the present application will be described in detail hereafter with reference to the embodiments.

Figure 1:
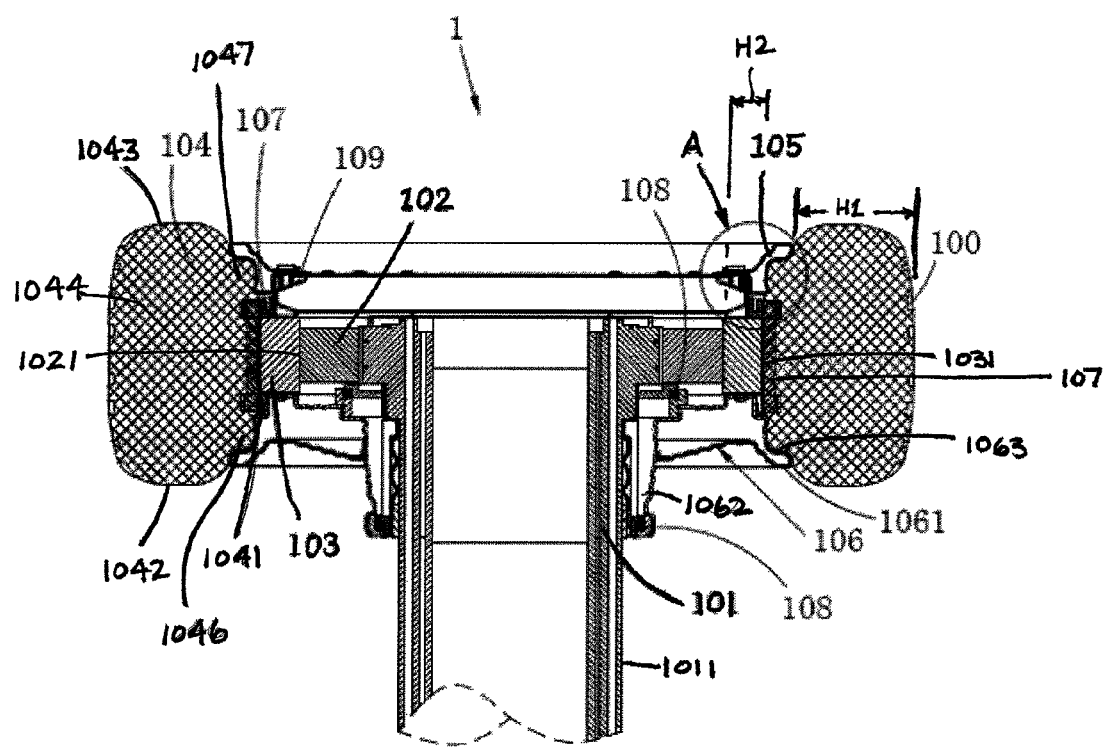
FIG. 1 is a schematic longitudinal cut-away view of a rotation structure with an elastic protection casing provided by an embodiment of the present application.
Figure 2:
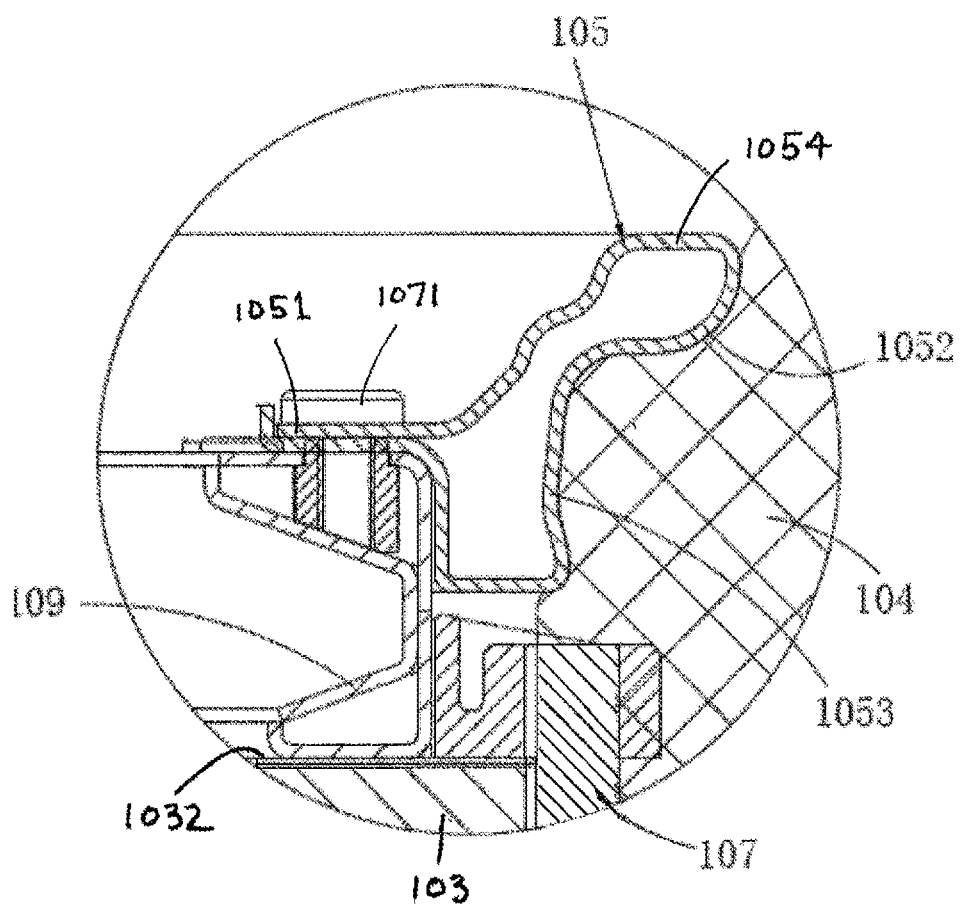
FIG. 2 is an enlarged view of the part A shown in FIG. 1.
Figure 3:
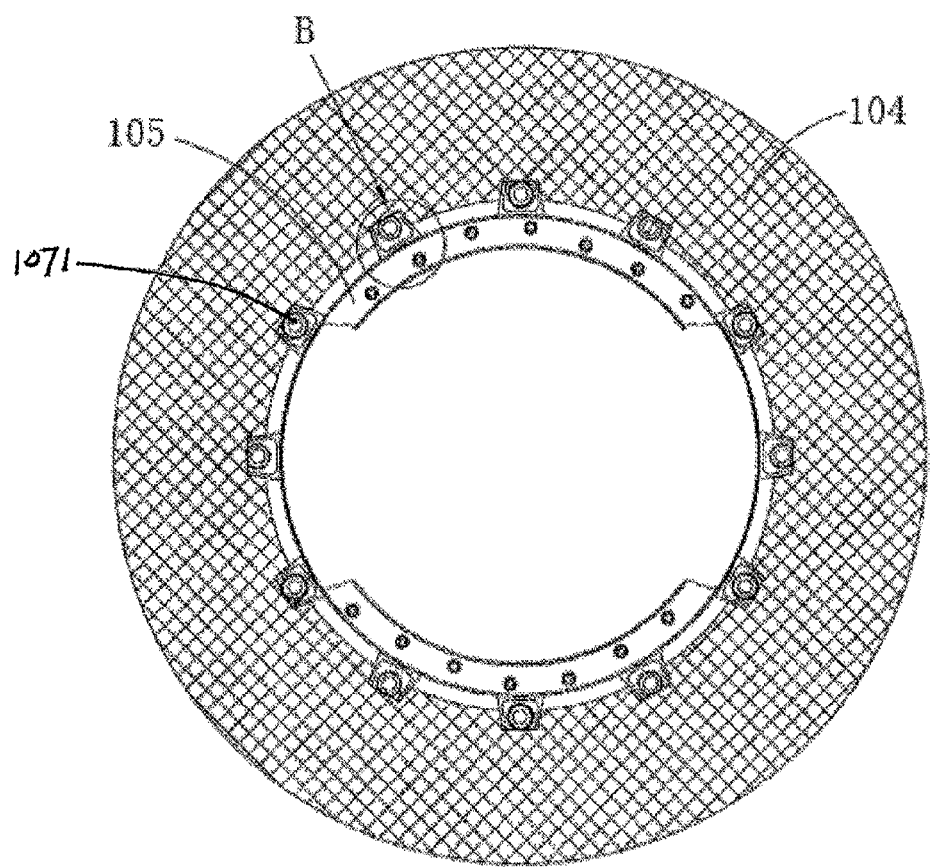
FIG. 3 is a schematic partial cut-away view of the rotation structure with the elastic protection casing provided by the embodiment of the present application.
Figure 4:
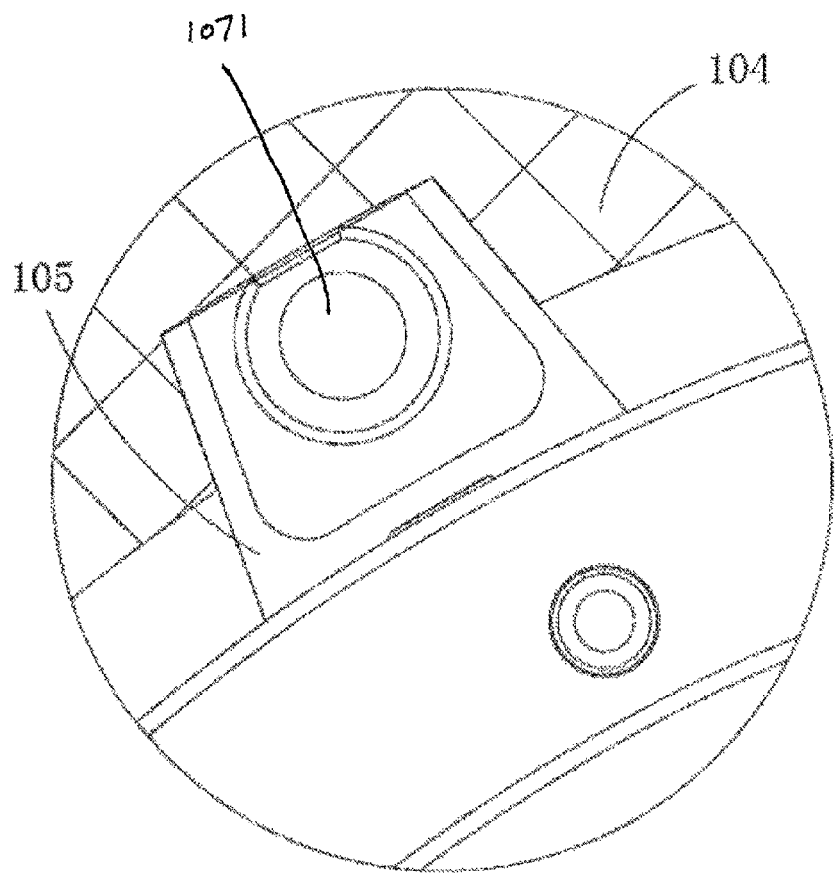
FIG. 4 is an enlarged view of the part B shown in FIG. 3.

FIGS. 1-4 show a preferred embodiment of the present application.

As shown in FIGS. 1-4, this embodiment provides a rotation structure 1, which can be used in various machine apparatuses as various parts, for example, as a power transmission device, a rotation wheel, or a tire. As long as a component needs to have rotation effect, the rotation structure 1 provided by this embodiment can serve as the component.

The rotation structure 1 includes a stator 102 and a rotor 103. The rotor 103 is substantially annular and sheathed on a periphery of the stator 102, there is a gap between an inside of the rotor 103 and an outside of the stator 102, so that the rotor 103 can rotate relative to the stator 102. An elastic protection casing 104 is sheathed on a periphery 1031 of the rotor 103, the elastic protection casing 104 is substantially annular and protrudingly arranged around the rotor 103.

The above-described rotation structure 1 includes the elastic protection casing 104 sheathed on the periphery 1031 of the rotor 103. Since the elastic protection casing 104 will be deformed when being subjected to an external force and resume its original shape (or at least a shape that is very approximate to its original shape) when the external force is removed, radial impacts of external forces onto the rotation structure 1 can be reduced during a working process. Moreover, since the elastic protection casing 104 is sheathed around the periphery of the rotor 103, it can prevent the periphery of the rotor 103 from being wetted or contacting corrosive gases or liquids directly, such that the rotation structure 1 is protected and thus the service life of the rotation structure 1 is greatly extended. Additionally, when the rotation structure 1 is rotating, most noise generated by the rotation structure 1 is absorbed by the elastic protection casing 104, such that the noise can be greatly reduced and the rotation structure 1 can be suitable for many situations with high requirements.

Additionally, when the rotation structure 1 needs to engage with other components, the elastic protection casing 104 can be used to contact other components directly, and thus the circumferential friction of the rotation structure 1 can be greatly increased. For example, when the rotation structure 1 is used as a power transmission component, connecting other components through the outside elastic protection casing 104 can obtain much better effect than connecting other components through the rotor 103 directly, both the circumferential and axial frictions can be greatly increased.

In this embodiment, the elastic protection casing 104 is substantially a closed loop, that is, it is arranged to surround the periphery of the rotor 103 continuously. In this way, the elastic protection casing 104 forms a substantial ring body, of which a longitudinal section has a polygonal shape. Of course, a specific shape of the polygonal section can be determined according to actual requirements.

In other embodiments, the shape of the elastic protection casing 104 can also be discontinuous annular, that is, the elastic protection casing 104 is arranged to surround the periphery of the rotor 103 discontinuously. The specific arrangement can be determined according to actual requirements.

A radial inner surface 1041 of the elastic protection casing 104 directly abuts against the periphery 1031 of the rotor 103. Two side surfaces, i.e., an inboard (lower per the orientation in FIG. 1) side surface 1042 and an outboard (upper per the orientation in FIG. 1) side surface 1043, of a radial outward end portion 1044 of the elastic protection casing 104 extend radially outward respectively and form an expanded structure. Step structures 1046, 1047 are formed between the radial inner surface 1041 of the elastic protection casing 104 and the radial outward end portion 1044 of the elastic protection casing 104, and a radial height H1 of each of the two side surfaces 1042, 1043 of the radial outward end portion 1044 of the elastic protection casing 104 is larger than a radial height H2 of the rotor 103. In this way, two sides of the periphery of the rotor 103 extend out of two ends of the rotor 103 so as to protect the two ends of the rotor 103 and prevent the two ends of the rotor 103 from being impacted by external components.

In order to improve the friction performance of the elastic protection casing 104, an outer surface of the elastic protection casing 104 is provided with an uneven structure 100. When the outer surface of the elastic protection casing 104 engages with other components, the uneven structure 100 on the outer surface can greatly increase the friction between the outer surface and other components.

In this embodiment, the stator 102 is sheathed on a periphery 1011 of a stator shaft 101, and a rotor supporting frame 106 is also sheathed on the periphery 1011 of the stator shaft 101. The rotor supporting frame 106 is connected with the stator shaft 101 through a bearing 108, such that the rotor supporting frame 106 can rotate relative to the stator shaft 101. Of course, the rotor supporting frame 106 can also be connected with the stator shaft 101 through other rotation structures, such as balls or rollers, as long as they can enable the rotor supporting frame 106 to rotate relative to the stator shaft 101, in other words, can realize a rotatable connection between the rotor supporting frame 106 and the stator shaft 101.

The rotor 103 is connected with the rotor supporting frame 106 and sheathed on the periphery 1021 of the stator 102. The aforementioned gap is formed between the inside of the rotor 103 and the outside of the stator 102. Along with the rotation of the rotor supporting frame 106 relative to the stator 102, the rotor 103 can also rotate relative to the stator 102.

A plurality of fastening members 107 arranged spacedly are sheathed on a periphery 1031 of the rotor 103. The plurality of fastening members 107 are arranged to surround the periphery 1031 of the rotor 103. It should be understood that the arrangement of the fastening members 107 can be a uniform surrounding arrangement, that is, intervals between adjacent fastening members 107 are identical. However, the arrangement of the fastening members 107 can also be an uneven surrounding arrangement, and the specific arrangement method can be determined according to actual requirements.

The elastic protection casing 104 is sheathed on the periphery 1031 of the rotor 103, and the radial inner surface 1041 of the elastic protection casing 104 abuts against the fastening members 107. In this way, along with the rotation of the rotor 103, the fastening members 107 rotate, and the elastic protection casing 104 rotates relative to the stator 102 too.

In this embodiment, an outboard (upper) end surface 1032 of the rotor 103 is provided with an arrest frame 109. The arrest frame 109 is substantially annular and arranged to extend along the upper end surface 1032 of the rotor 103. The arrest frame 109 is fixedly connected on the rotor 103, and can rotate along with the rotation of the rotor 103.

In order to further improve the stability of the elastic protection casing 104 so as to connect the elastic protection casing 104 with the rotor 103 fixedly, in this embodiment, the upper end surface 1032 of the rotor 103 is provided with an upper fixing frame 105, which is arranged to extend along and surround the upper end surface of the rotor 103. One (radial inner) end 1051 of the upper fixing frame 105 is connected with the arrest frame 109, it should be understood that the upper fixing frame 105 can be connected with the arrest frame 109 by fastening members 1071, for example, screws, and can also be connected with the arrest frame 109 by other various connection methods, as long as they can enable the upper fixing frame 105 to be fixedly connected with the arrest frame 109. Another (radial outer) end 1054 of the top fixing frame 105 extends towards the radial outward end portion 1044 of the elastic protection casing 104 to form an upper pressing board 1052, the upper pressing board 1052 presses against the step structure 1047 on the upper side surface 1043 of the radial outward end portion 1044 of the elastic protection casing 104, such that the top pressing board 1052 secures the elastic protection casing 104 from the upper side surface 1043.

In particular, the upper pressing board 1052 presses against the step structure 1047 on the upper side surface 1043 of the radial outward end portion 1044 of the elastic protection casing 104 and extends out of the step structure 1047. In this way, the pressure towards the upper side surface 1043 of the elastic protection casing 104 can be increased. Of course, correspondingly, the upper pressing board 1052 can be provided with a matching structure corresponding to the step structure 1047, thereby ensuring the abutting connection between the upper pressing board 1052 and the upper side surface 1043 of the elastic protection casing 104.

In this embodiment, one radial inner end 1062 of the rotor supporting frame 106 is rotatably connected with the stator shaft 101, and another radial outer end 1061 of the rotor supporting frame 106 extends towards the radial outward end portion 1044 of the elastic protection casing 104 to form a lower pressing board 1063. The lower pressing board 1063 presses against the step structure 1046 on the lower side surface 1042 of the radial outward end portion 1044 of the elastic protection casing 104, such that the lower pressing board 1063 secures the elastic protection casing 104 from the lower side surface 1042.

In particular, the lower pressing board 1063 presses against the step structure 1046 on the lower side surface 1042 of the radial outward end portion 1044 of the elastic protection casing 104 and extends out of the step structure 1046. In this way, the pressure towards the lower side surface 1042 of the elastic protection casing 104 can be increased. Of course, correspondingly, the lower pressing board 1063 can be provided with a matching structure corresponding to the step structure 1046, thereby ensuring the abutting connection between the lower pressing board 1063 and the lower side surface 1042 of the elastic protection casing 104.

In this way, the radial inner surface 1041 of the elastic protection casing 104 abuts against the fastening members 107 arranged at the periphery 1031 of the rotor 103, and the upper and lower side surfaces 1043, 1042 are pressed by the upper pressing board 1052 and the lower pressing board 1063 respectively, so that the elastic protection casing 104 is fixed along several directions, and thus the elastic protection casing 104 is stably connected with the periphery of the rotor 103.

In this embodiment, the radial inner surface 1041 of the elastic protection casing 104 can be connected with the periphery 1031 of the rotor 103 in a way of direct adhesion or direct engagement. Of course, it is also possible to perform injection molding around the periphery 1031 of the rotor 103 to form the elastic protection casing 104. There can also be many connection methods, and the specific method can be determined according to actual requirements.

The rotation structure 1 provided by this embodiment can be used as various components. As long as rotation effect is required, the rotation structure 1 can be adopted. It should be understood that when the rotor 103 is integrated with the stator 102, for example, the stator shaft 101 is fixed on a carriage by any possible method, the rotor 103 and the stator 102 of the rotation structure 1 can form a smart hub, and the whole rotation structure 1 can serve as a tire.

The above are only preferred embodiments of the present application and are not intended to limit the present application. Any modification, equivalent replacement, and improvement made within the spirit and principle of the present application should be included in the protection scope of the present application.

What is claimed is:

1. A rotation structure with an elastic protection casing, comprising a stator (102) and a rotor (103), wherein the rotor (103) is sheathed on a periphery (1021) of the stator (103), and characterized in that: a periphery (1031) of the rotor (103) is provided with the elastic protection casing (104), the elastic protection casing (104) is substantially annular and arranged to surround the periphery (1031) of the rotor (103), and further comprising a plurality of fastening members (107) arranged spacedly between the periphery (1031) of the rotor (103) and a radial inner surface (1041) of the elastic protection casing (104), and the radial inner surface (1041) of the elastic protection casing (104) abuts against the fastening members (107), which are elongated in an axial direction;

an arrest frame (109) extending along and surrounding an outboard end surface (1032) of the rotor (103);

a fixing frame (105) extending along and surrounding the outboard end surface (1032) of the rotor (103), a radial inner end (1051) of the fixing frame (105) is connected with the arrest frame (109), and a radial outer end (1054) of the fixing frame (105) extends towards a radial outward end portion (1044) of the elastic protection casing (104) to form an outboard pressing board pressing against a step structure (1047) on an outboard side surface (1043) of the radial outward end portion (1044) of the elastic protection casing (104);

a rotor supporting frame (106) having a radial inner end (1062) rotatably connected with a stator shaft (101) and a radial outer end (1061) extending towards the radial outward end portion (1044) of the elastic protection casing (104) to form a bottom pressing board pressing against another step structure (1046) on an inboard side surface (1042) of the elastic protection casing (104).

2. The rotation structure with the elastic protection casing of claim 1, wherein a radial height of each of the inboard and outboard side surfaces of the radial outward end portion of the elastic protection casing is larger than a radial height of the rotor.

\* \* \* \* \*